US007209891B1

(12) United States Patent
Addy et al.

(10) Patent No.: US 7,209,891 B1
(45) Date of Patent: Apr. 24, 2007

(54) METHOD AND APPARATUS FOR OPERATING A CONFIGURABLE REMOTE SUPERVISOR TERMINAL OF A SELF-SERVICE RETAIL CHECKOUT SYSTEM

(75) Inventors: John C. Addy, Lawrenceville, GA (US); Scott A. Barnhart, Lawrenceville, GA (US)

(73) Assignee: NCR Corporation, Dayton, OH (US)

( * ) Notice: Subject to any disclaimer, the term of this patent is extended or adjusted under 35 U.S.C. 154(b) by 0 days.

(21) Appl. No.: 09/245,592

(22) Filed: Feb. 8, 1999

(51) Int. Cl.
*G06F 17/60* (2006.01)
(52) U.S. Cl. .......................... 705/21; 705/16
(58) Field of Classification Search ................ 705/16, 705/21, 17, 18; 235/376, 377, 378; 186/59
See application file for complete search history.

(56) References Cited

U.S. PATENT DOCUMENTS

| 4,676,343 | A |   | 6/1987  | Humble et al. |
| 4,792,018 | A |   | 12/1988 | Humble et al. |
| 4,845,636 | A | * | 7/1989  | Walker        |
| 4,882,724 | A | * | 11/1989 | Vela et al.   |

(Continued)

FOREIGN PATENT DOCUMENTS

EP         0 673 006     *   3/1994

(Continued)

OTHER PUBLICATIONS

Hennessy, Terry. "Taking control," Progressive Grocer, vol. 77, Issue 12, p. 83, Dec. 1998.*

(Continued)

*Primary Examiner*—James Kramer
*Assistant Examiner*—Steven R. Wasylchak
(74) *Attorney, Agent, or Firm*—Maginot, Moore & Beck LLP

(57) ABSTRACT

A method of operating a retail system which includes a plurality of self-service checkout terminals, a first remote supervisor terminal, and a second remote supervisor terminal includes the step of operating the first remote supervisor terminal such that the first remote supervisor terminal monitors operation of each of the plurality of self-service checkout terminals during a first period of time. The method also includes the step of maintaining the second remote supervisor terminal in an idle mode of operation such that the second remote supervisor terminal does not monitor operation of any of the plurality of self-service checkout terminals during the first period of time. Yet further, the method includes the step of operating the first remote supervisor terminal such that the first remote supervisor terminal monitors operation of a first group of the plurality of self-service checkout terminals during a second period of time. In addition, the method includes the step of operating the second remote supervisor terminal such that the second remote supervisor terminal monitors operation of a second group of the plurality of self-service checkout terminals during the second period of time. A self-service retail system is also disclosed.

17 Claims, 8 Drawing Sheets

U.S. PATENT DOCUMENTS

| | | |
|---|---|---|
| 5,393,965 A | 2/1995 | Bravman et al. |
| 5,426,282 A | 6/1995 | Humble |
| 5,482,139 A * | 1/1996 | Rivalto |
| 5,494,136 A | 2/1996 | Humble |
| 5,497,314 A * | 3/1996 | Novak ......................... 364/403 |
| 5,604,341 A | 2/1997 | Grossi et al. |
| 5,747,784 A * | 5/1998 | Walter et al. ................ 235/383 |
| 5,822,216 A * | 10/1998 | Satchell et al. |
| 5,952,642 A * | 9/1999 | Lutz ............................ 253/383 |
| 5,965,861 A * | 10/1999 | Addy et al. .................. 235/383 |
| 6,047,262 A * | 4/2000 | Lutz ............................. 705/16 |
| 6,056,087 A * | 5/2000 | Addy et al. .................... 186/61 |
| 6,105,866 A * | 8/2000 | Morrison et al. ............ 235/383 |
| 6,112,857 A * | 9/2000 | Morrison ...................... 186/61 |
| 6,167,381 A * | 12/2000 | Swaine et al. ................. 705/17 |

FOREIGN PATENT DOCUMENTS

| | | | |
|---|---|---|---|
| EP | 0 689 151 | * 4/1995 | ...................... 7/10 |

OTHER PUBLICATIONS

"Techtracks", Discount Merchandiser, vol. 37, Issue 9, p. 46, Sep. 1997.*

"Technically Speaking," American Libraries, vol. 26, Issue 9, p. 930, Oct. 1995.*

"New Products," Chain Store age, vol. 72, Issue 7, p. 73, Jul. 1996.*

Harry Newton. Nwton's Telecom Dictionary. Flatiron Publishing. p. 473. 1998.*

* cited by examiner

METHOD AND APPARATUS FOR OPERATING A CONFIGURABLE REMOTE SUPERVISOR TERMINAL OF A SELF-SERVICE RETAIL CHECKOUT SYSTEM

TECHNICAL FIELD OF THE INVENTION

The present invention relates generally to a retail checkout system, and more particularly to a method and apparatus for operating a configurable remote supervisor terminal of a self-service retail checkout system.

BACKGROUND OF THE INVENTION

In the retail industry, the largest expenditures are typically the cost of the goods sold followed closely by the cost of labor expended. With particular regard to the retail grocery or supermarket industry, the impetus to reduce labor costs has focused on reducing or eliminating the amount of time required to handle and/or process the items or goods to be purchased by a customer. To this end, there have been a number of self-service checkout terminal concepts developed which attempt to substantially eliminate the need for a checkout clerk.

A self-service checkout terminal is a system which is operated by a customer without the aid of a checkout clerk. In such a system, the customer scans individual items for purchase across a scanner and then places the scanned item into a grocery bag, if desired. The customer then pays for his or her purchase either at the self-service checkout terminal if so equipped, or at a central payment area such as a supervisor or payment terminal which is staffed by a store employee. Thus, a self-service checkout terminal permits a customer to select, itemize, and in some cases pay for his or her items for purchase without the assistance of the retailer's personnel.

However, in certain circumstances it is necessary for retail personnel to intervene in order to complete the customer's transaction during operation of the self-service checkout terminal. Such intervention is typically performed by a store employee such as a retail clerk or a customer service manager. Examples of situations which require intervention by the retail clerk or customer service manager include (1) collection of coupons, (2) acceptance of tendered checks, (3) handling of credit card verification exceptions, (4) itemization of items that the customer is unable to scan or otherwise enter, and (5) itemization of difficult items such as the identification of exotic produce and the like.

In order to provide for such intervention, self-service checkout terminals have heretofore been designed to include a summoning device such as a tri-colored signal lamp which is utilized to notify or otherwise summon a retail clerk or customer service manager when it is necessary for a store employee to intervene in the customer's checkout transaction. Thereafter, a store employee approaches the self-service checkout terminal so as to respond to the customer's intervention request. This manner of providing intervention undesirably requires the store employee to move from terminal to terminal thereby potentially causing undesirable customer delays if several terminals require intervention within the same general time period.

Another approach which has been taken to providing such intervention is to utilize a store employee operating a remote terminal to provide the necessary intervention into the customer's transaction. In such a configuration, the store employee operating the remote terminal may, for example, approve credit and check payment transactions, enter the product identification code associated with an unscannable item, or identify an exotic produce item via use of a video system. However, use of remote terminals in the manner described above has a number of drawbacks associated therewith. For example, retail checkout systems which have heretofore been designed undesirably dedicate a single remote terminal to a fixed, predetermined number of self-service checkout terminals. For instance, as shown in FIG. 8, a first remote terminal 110 is dedicated to servicing a first pair of self-service checkout terminals 112, 114, whereas a second remote terminal 210 is dedicated to servicing a second pair of self-service checkout terminals 212, 214. It should be appreciated that in regard to self-service retail checkout systems which have heretofore been designed, the remote terminal 110 could not be utilized to monitor the self-service checkout terminals 212, 214, whereas similarly, the remote monitoring station 210 could not be utilized to monitor the self-service checkout terminals 112, 114. Hence, assuming a given remote terminal is dedicated to a particular pair of self-service checkout terminals, a retail checkout system having eight self-service checkout terminals would be required to have four remote terminals. Moreover, if either one of a given pair of self-service checkout terminals (e.g. the self-service checkout terminal 114) is operational, the remote terminal associated therewith (e.g. the remote terminal 110) must be staffed by a store employee even if the other self-service checkout terminal of the pair (e.g. the self-service checkout terminal 112) is not operational thereby potentially increasing labor costs associated with the retailer's operation.

What is needed therefore is a retail system which overcomes one or more of the above-mentioned drawbacks. What is particularly needed is a method and apparatus for operating a retail system which provides flexibility in regard to the number and location of the self-service checkout terminals which are monitored by a single remote terminal.

SUMMARY OF THE INVENTION

In accordance with a first embodiment of the present invention, there is provided a method of operating a retail system which includes a plurality of self-service checkout terminals, a first remote supervisor terminal, and a second remote supervisor terminal. The method includes the step of operating the first remote supervisor terminal such that the first remote supervisor terminal monitors operation of each of the plurality of self-service checkout terminals during a first period of time. The method also includes the step of maintaining the second remote supervisor terminal in an idle mode of operation such that the second remote supervisor terminal does not monitor operation of any of the plurality of self-service checkout terminals during the first period of time. Yet further, the method includes the step of operating the first remote supervisor terminal such that the first remote supervisor terminal monitors operation of a first group of the plurality of self-service checkout terminals during a second period of time. In addition, the method includes the step of operating the second remote supervisor terminal such that the second remote supervisor terminal monitors operation of a second group of the plurality of self-service checkout terminals during the second period of time.

In accordance with a second embodiment of the present invention, there is provided a method of operating a retail system. The method includes the step of operating a first remote supervisor terminal so as to monitor operation of a first group of self-service checkout terminals during a first period of time. The method also includes the step of operating a second remote supervisor terminal so as to monitor operation of a second group of self-service checkout terminals during the first period of time. Moreover, the method includes the step of operating the first remote supervisor terminal so as to monitor operation of the second group of self-service checkout terminals during a second period of time. Yet further, the method includes the step of operating the second remote supervisor terminal so as to monitor operation of the first group of self-service checkout terminals during the second period of time.

In accordance with a third embodiment of the present invention, there is provided a self-service retail system comprising. The self-service retail system includes a plurality of self-service checkout terminals for allowing a plurality of customers to checkout items for purchase. The service retail system also includes a first remote supervisor terminal electrically coupled to each of the plurality of self-service checkout terminals. Moreover, the self-service retail system includes a second remote supervisor terminal electrically coupled to each of the plurality of self-service checkout terminals. The first remote supervisor terminal is configured to monitor operation of each of the plurality of self-service checkout terminals during a first period of time. The second remote supervisor terminal is maintained in an idle mode of operation during the first period of time. The first remote supervisor terminal is further configured to monitor operation of a first group of the plurality of self-service checkout terminals during a second period of time. The second remote supervisor terminal is further configured to monitor operation a second group of the plurality of self-service checkout terminals during the second period of time.

It is therefore an object of the present invention to provide a new and useful method and apparatus of operating a self-service retail system.

It is moreover an object of the present invention to provide an improved method and apparatus for operating a self-service retail system.

It is yet further an object of the present invention to provide a method and apparatus for operating a self-service retail system which provides flexibility in regard to the number and location of the self-service checkout terminals which are monitored by a single remote monitoring station.

The above and other objects, features, and advantages of the present invention will become apparent from the following description and the attached drawings.

DETAILED DESCRIPTION OF THE INVENTION

Figure 1:
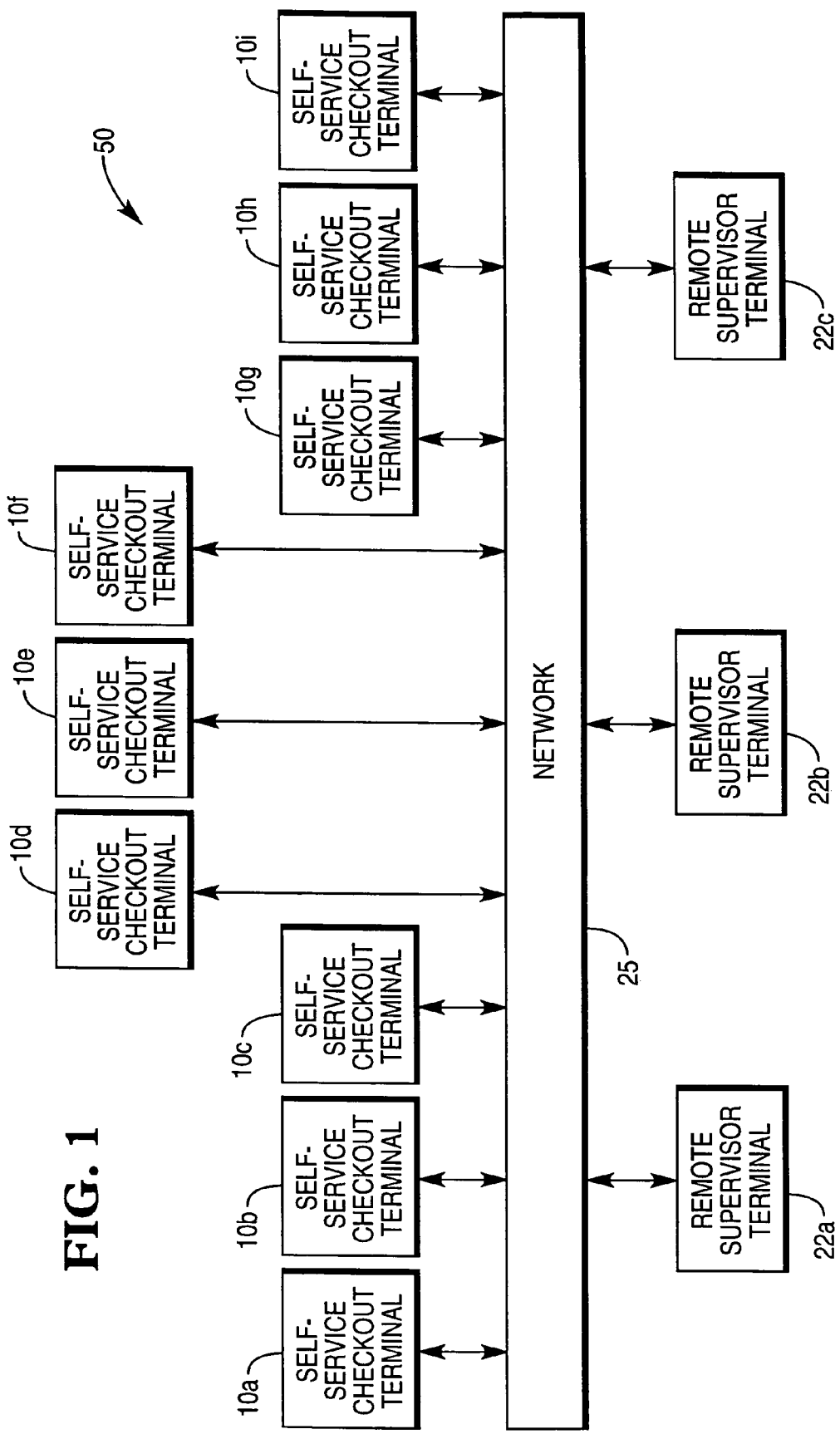
FIG. 1 is a simplified block diagram of a self-service retail system which incorporates the features of the present invention therein.

While the invention is susceptible to various modifications and alternative forms, a specific embodiment thereof has been shown by way of example in the drawings and will herein be described in detail. It should be understood, however, that there is no intent to limit the invention to the particular form disclosed, but on the contrary, the intention is to cover all modifications, equivalents, and alternatives falling within the spirit and scope of the invention as defined by the appended claims.

Referring now to FIG. 1, there is shown a self-service retail system 50 for use in a retail business such as a grocery store. The self-service retail system 50 includes a number of self-service checkout terminals 10 (hereinafter referred to individually as self-service checkout terminals 10a, 10b, 10c, 10d, 10e, 10f, 10g, 10h, and 10i), and a number of remote supervisor terminals 22a, 22b, and 22c. Each of the self-service checkout terminals 10a, 10b, 10c, 10d, 10e, 10f, 10g, 10h, and 10i is electrically coupled to each of the remote supervisor terminals 22a, 22b, and 22c via a network 25 such as a LAN or WAN. The self-service checkout terminals 10a, 10b, 10c, 10d, 10e, 10f, 10g, 10h, and 10i communicate with components coupled to the retailer's network 25 such as data servers and the like during a checkout procedure in order to obtain information, such as pricing information, associated with an item being scanned or otherwise entered, and also to verify customer credit approval when appropriate.

Moreover, the remote supervisor terminals 22a, 22b, and 22c communicate with the self-service checkout terminals 10a, 10b, 10c, 10d, 10e, 10f, 10g, 10h, and 10i via the retailer's network 25 in order to monitor operation of the self-service checkout terminals 10a, 10b, 10c, 10d, 10e, 10f, 10g, 10h, and 10i by the customers operating each of the respective checkout terminals. What is meant herein by the terms "monitor operation" or "monitors operation" is that one of the remote supervisor terminals 22a, 22b, 22c is in communication with the self-service checkout terminal 10a, 10b, 10c, 10d, 10e, 10f, 10g, 10h, 10i so as to perform supervisory functions that facilitate proper operation of the self-service checkout terminals 10a, 10b, 10c, 10d, 10e, 10f, 10g, 10h, 10i by the customer. Examples of such supervisory functions include (1) assisting customers in regard to operation of the self-service checkout terminal via an audio/video connection between the checkout terminal and the remote supervisor terminal, (2) providing security to the self-service checkout terminal such as by observing the customers checkout transaction via the video connection, (3) collecting coupons or vouchers from customers, (4) accepting tendered checks from customers, (5) handling credit card verification exceptions, (6) itemizing items that the customer is unable to scan or otherwise enter, and (7) itemizing difficult items such as the identification of exotic produce and the like. As shall be discussed below in more detail, any one of the remote supervisor terminals 22a, 22b, 22c may monitor operation of any number or combination of the self-service checkout terminals 10a, 10b, 10c, 10d, 10e, 10f, 10g, 10h, 10i thereby enhancing the flexibility of the self-service retail system 50.

Figure 2:
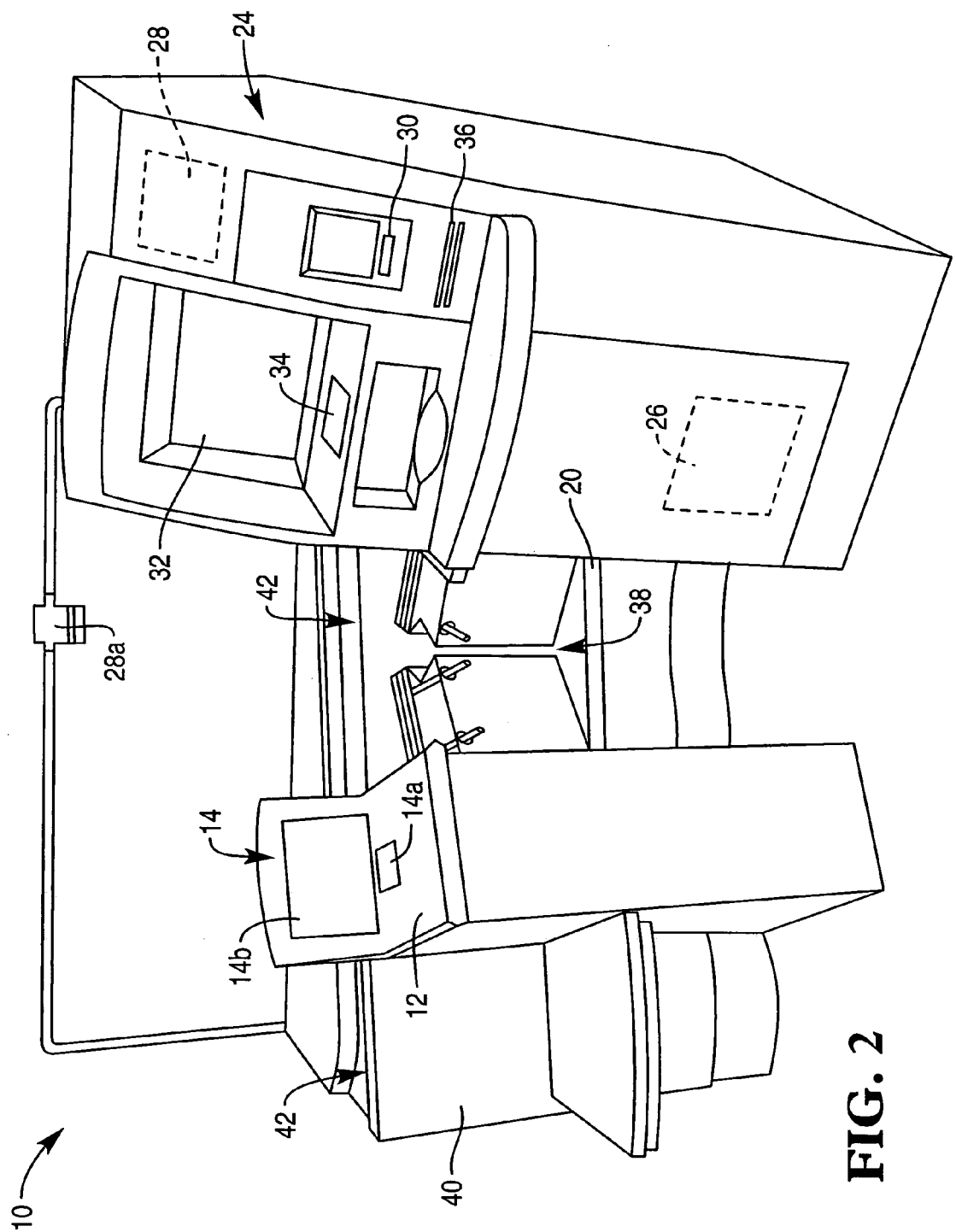
FIG. 2 is a perspective view of one of the self-service checkout terminals of the retail system of FIG. 1.

Referring now to FIG. 2, there is shown one of the self-service checkout terminals 10 of the retail system 50 which includes a product scale 12, a scanner 14, a bagwell scale 20, a video system 28, a card reader 30, a display monitor 32, a keypad 34, a printer 36, and a processing unit 26. The card reader 30, the display monitor 32, the keypad 34, and the printer 36 may be provided as separate components, or alternatively may preferably be provided as components of an automated teller machine (ATM) 24.

The self-service checkout terminal 10 also includes a bagwell 38 for accommodating one or more grocery bags (not shown) and a base 40 having a counter 42 secured thereto. The counter 42 defines an arcuate surface as shown in FIG. 2. Such an arcuate surface allows the scanner 14 to be positioned relatively close or otherwise proximate the ATM 24 and hence the components associated therewith. Such a configuration facilitates a user's (e.g. customer's) use of the self-service checkout terminal 10. Moreover, the bagwell 38 is configured to allow two or more grocery bags to be accessed by the customer at any given time thereby allowing a customer to selectively load various item types into the grocery bags. For example, the customer may desire to use a first grocery bag for household chemical items such as soap or bleach, and a second grocery bag for edible items such as meat and produce.

The scanner 14 conventionally scans or reads a product identification code such as a Universal Product Code (UPC), industrial symbol(s), alphanumeric character(s), or other indicia associated with an item to be purchased. One scanner which may be used in the present invention is a model number 7875 bi-optic scanner which is commercially available from NCR Corporation of Dayton, Ohio.

The scanner 14 includes a first scanning window 14a and a second scanning window 14b. The first scanning window 14a is disposed in a substantially horizontal manner, whereas the second scanning window 14b is disposed in a substantially vertical manner, as shown in FIG. 2. The product scale 12 is integrated with the scanner 14. More specifically, the product scale 12 is disposed substantially parallel to the scanning window 14a thereby enveloping the scanning window 14a. If an item such as produce is placed upon the product scale 12 or the first scanning window 14a, the product scale 12 may be used to determine the weight of the item.

The scanner 14 also includes a light source (not shown) such as a laser, a rotating mirror (not shown) driven by a motor (not shown), and a mirror array (not shown). In operation, a laser beam reflects off the rotating mirror and mirror array to produce a pattern of scanning light beams. As the product identification code on an item is passed over the scanner 14, the scanning light beams scatter off the code and are returned to the scanner 14 where they are collected and detected. The reflected light is then analyzed electronically in order to determine whether the reflected light contains a valid code pattern. If a valid code pattern is present, the product identification code may then be utilized to retrieve product information associated with the item (e.g. the price of the item).

The display monitor 32 displays instructions which serve to guide a customer through a checkout procedure. For example, an instruction is displayed on the display monitor 32 which instructs the customer to enter an item into the self-service checkout terminal 10 by either passing the item over the scanner 14, or placing the item on the product scale 12 in order to obtain the weight of the item. The display monitor 32 is preferably a known touch screen monitor which can generate data signals when certain areas of the screen are touched by a customer.

The bagwell scale 20 is a weight scale which monitors the weight of items placed in the bagwell 38 (i.e. into a grocery bag) or onto the portion of the counter 42 which is located proximate the bagwell 38. It should be appreciated that a customer may place an item onto the portion of the counter 42 proximate the bagwell 38 subsequent to entering the item, but prior to placing the item into a grocery bag. For example, if a customer scans a loaf of bread, the customer may want to place the bread onto the portion of the counter 42 proximate the bagwell 38 until one of the grocery bags is nearly full thereby preventing the bread from being crushed. Hence, the bagwell scale 20 may be utilized to monitor the ingress and egress of items into and out of the bagwell 38 along with onto and off of the counter 42. Such monitoring is particularly useful for preventing items which have not been scanned from being placed into a grocery bag.

The video system 28 includes a video camera 28a, and is included in the self-service checkout terminal 10 to enhance the security thereof. In particular, the video system 28 is provided to capture and transmit video images relating to certain events during a customer's transaction to a display monitor 60 (see FIG. 3) associated with one of the remote supervisor terminals 22a, 22b, 22c. It should be appreciated that the video system 28 may capture and thereafter transmit video images associated with the identification of items such as exotic produce items. Moreover, such video images may track the manner in which a customer enters and thereafter handles items for entry. Moreover, such video images may include a video record of the customer himself or herself. Hence, it should be appreciated from the above discussion that the video system 28 may be configured to capture and thereafter transmit any event associated with a customer's operation of one of the self-service checkout terminals 10a, 10b, 10c, 10d, 10e, 10f, 10g, 10h, and 10i as determined by a particular retailer.

It should be appreciated that the self-service checkout terminals 10a, 10b, 10c, 10d, 10e, 10f, 10g, 10h, and 10i may also be configured with other communication components so as to facilitate communication between the self-service checkout terminals 10a, 10b, 10c, 10d, 10e, 10f, 10g, 10h, and 10i and the remote supervisor terminals 22a, 22b, 22c. For example, each of the self-service checkout terminals 10a, 10b, 10c, 10d, 10e, 10f, 10g, 10h, and 10i may be configured to include a microphone and a speaker assembly for allowing the customer to speak to retail personnel operating the supervisor terminals 22a, 22b, 22c and thereafter hear the response via the speaker assembly.

Figure 3:
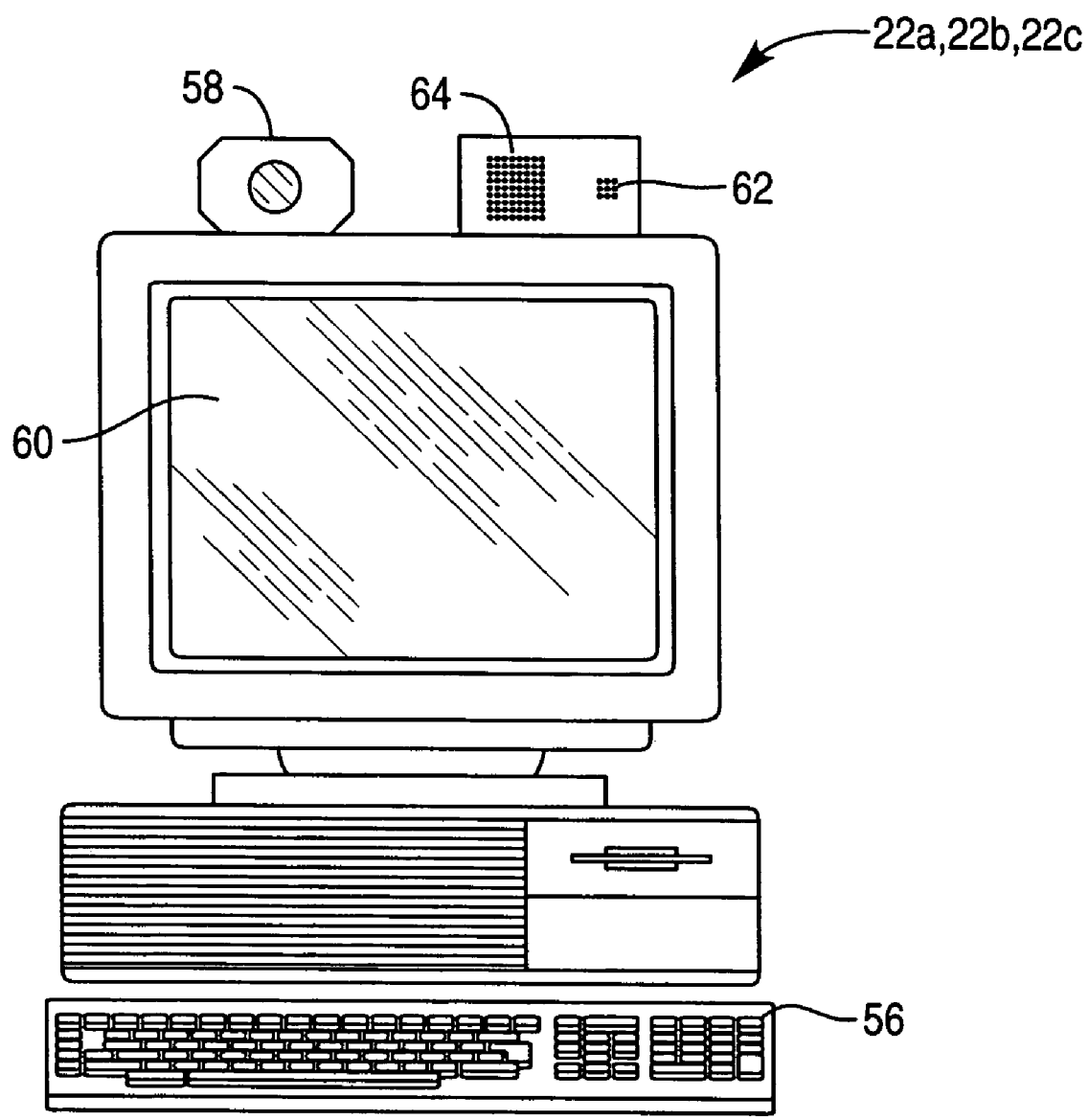
FIG. 3 is a perspective view of one of the remote supervisor terminals of the retail system of FIG. 1.

Referring now to FIG. 3, there is shown an exemplary supervisor terminal which may be utilized as the supervisor terminals 22a, 22b, 22c of the present invention. Each of the supervisor terminals 22a, 22b, 22c includes a keyboard 56, a video camera 58, the display monitor 60, a microphone 62, and a speaker 64. The keyboard 56 is provided to allow retail personnel operating the remote supervisor terminal 22a, 22b, 22c to enter a text message which may be displayed on one of the display monitors 32 associated with a particular self-service checkout terminal 10a, 10b, 10c, 10d, 10e, 10f, 10g, 10h, and 10i. Moreover, if the customer operating one of the self-service checkout terminals 10a, 10b, 10c, 10d, 10e, 10f, 10g, 10h, and 10i does not know the product code associate with a certain item for purchase, retail personnel operating the remote supervisor terminal 22a, 22b, 22c may enter the product code via use of the keyboard 56.

Moreover, the video camera 58 may be utilized to capture and transmit video images of retail personnel operating the remote supervisor terminal 22a, 22b, 22c. Such video images may be displayed on the display monitor 32 of a given self-service checkout terminal 10a, 10b, 10c, 10d, 10e, 10f, 10g, 10h, and 10i for purposes such as conducting a video conference between the customer and retail personnel operating the remote supervisor terminal 22a, 22b, 22c. The microphone 62 and the speaker 64 are utilized to allow the operator of the remote supervisor terminal 22a, 22b, 22c to carry on a voice conversation with the customer operating the particular self-service checkout terminal 10a, 10b, 10c, 10d, 10e, 10f, 10g, 10h, and 10i.

Figure 4:
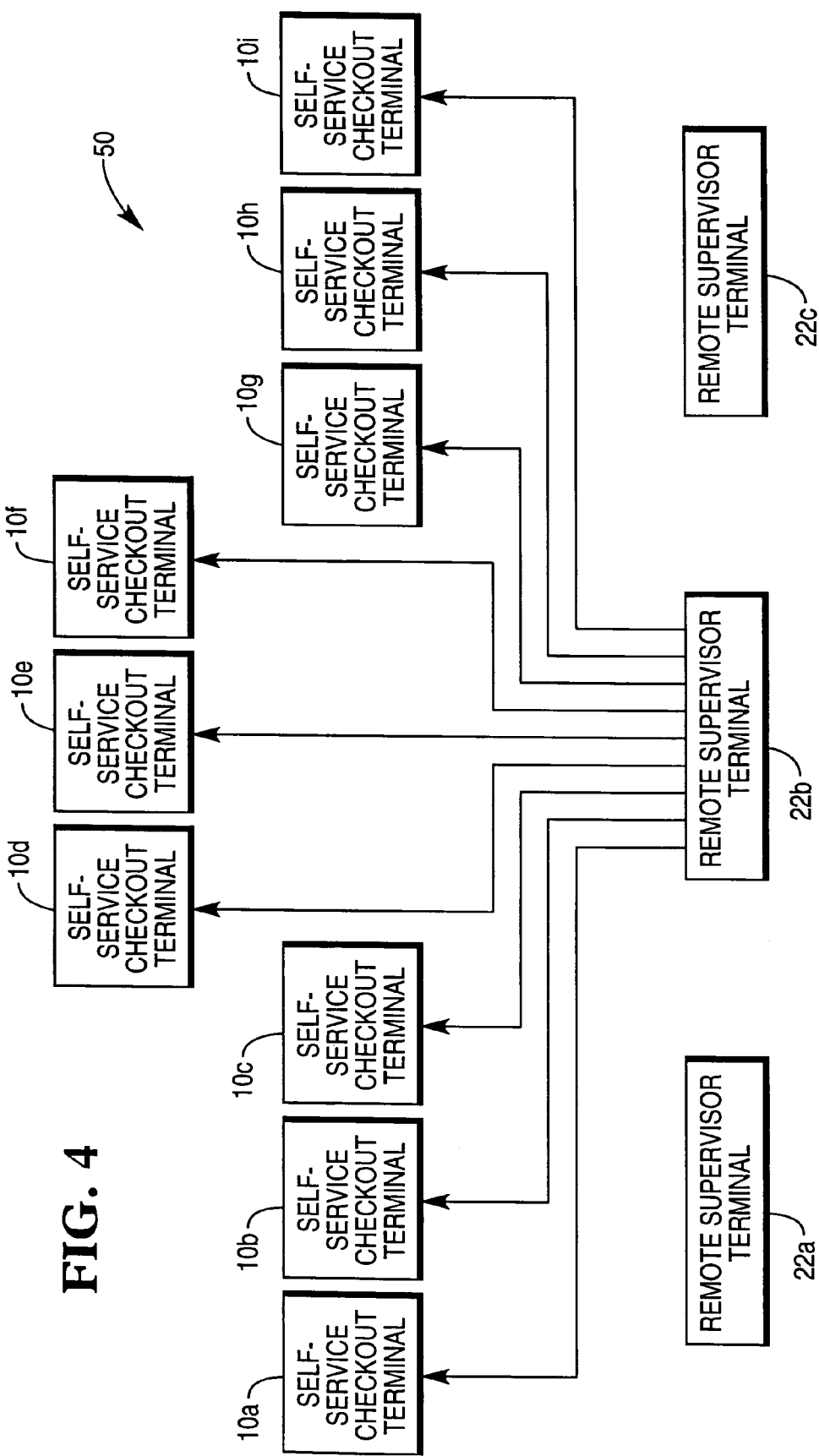
FIG. 4 is a simplified diagram of the retail system of FIG. 1 which shows a single remote supervisor terminal monitoring operation of all of the self-service checkout terminals.

As discussed above, each of the remote supervisor terminals 22a, 22b, 22c is configured to monitor operation of any number or combination of the self-service checkout terminals 10a, 10b, 10c, 10d, 10e, 10f, 10g, 10h, and 10i. For example, as shown in FIG. 4, during periods of relatively light demand (i.e. a relatively small number of customers are present in the retailer's store), a single remote supervisor terminal (e.g. the remote supervisor terminal 22b) may be operated to monitor operation of all of the self-service checkout terminals 10a, 10b, 10c, 10d, 10e, 10f, 10g, 10h, and 10i. Hence, during such periods of relatively light demand, a single store employee may operate one of the remote supervisor terminals (e.g. the remote supervisor terminal 22b) in order to assist customers and provide security to each of the self-service checkout terminals 10a, 10b, 10c, 10d, 10e, 10f, 10g, 10h, and 10i thereby eliminating the need to staff the remaining remote supervisor terminals (e.g. the remote supervisor terminals 22a, 22c).

Figure 5:
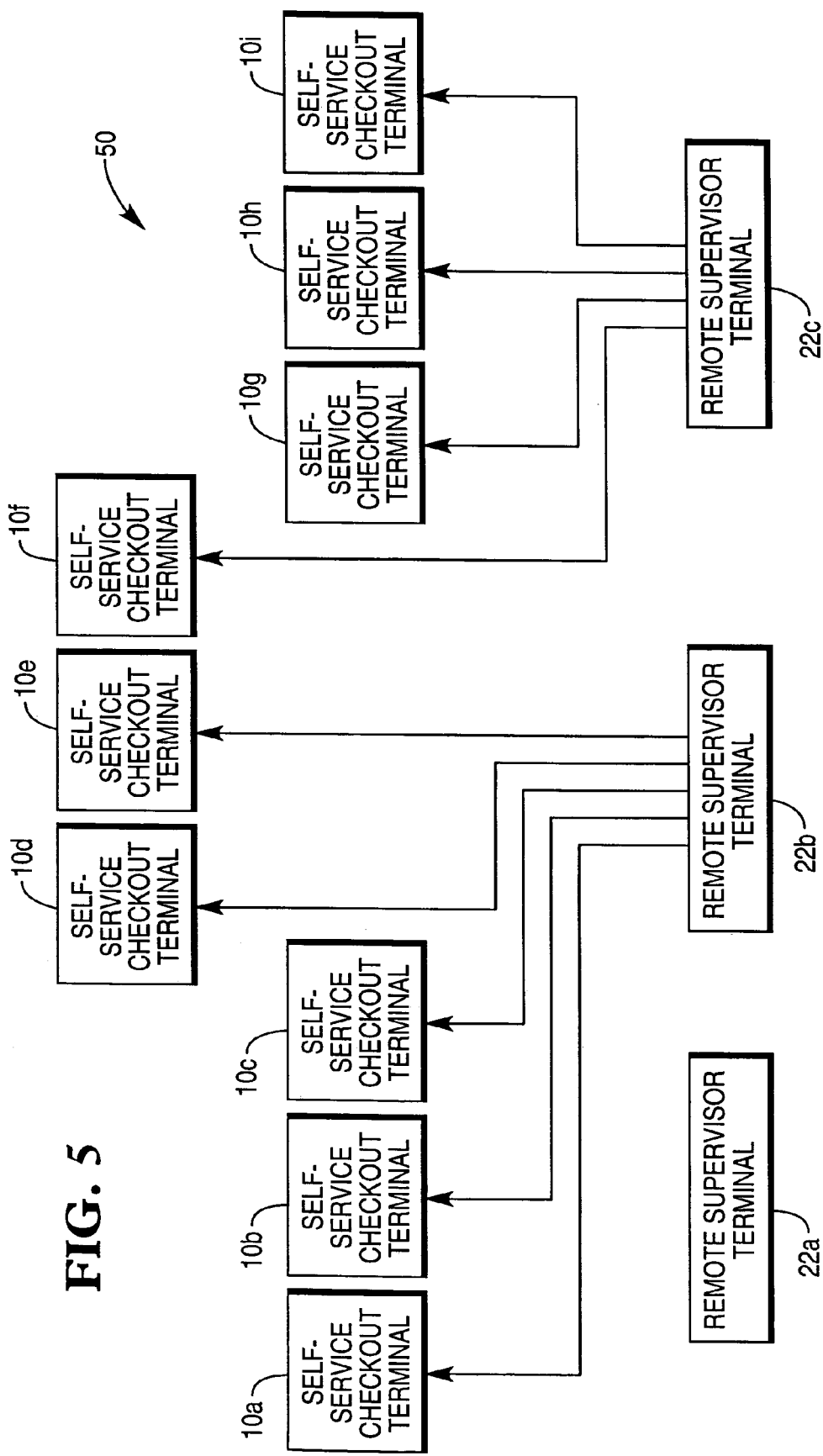
FIG. 5 is a view similar to FIG. 4, but showing a first remote supervisor terminal monitoring operation of a first group of the self-service checkout terminals, and a second remote supervisor terminal monitoring operation of a second group of the self-service checkout terminals.

However, as demand in the store increases, a second remote supervisor terminal (e.g. the remote supervisor terminal 22c) may "open" as shown in FIG. 5. In such a situation, the self-service retail system 50 is dynamically reconfigured such that the remote supervisor terminal 22b is operated to monitor operation of a first group of the self-service checkout terminals (e.g. the self-service checkout terminals 10a, 10b, 10c, 10d, 10e), whereas the remote supervisor terminal 22c is operated to monitor operation of a second group of the self-service checkout terminals (e.g. the self-service checkout terminals 10f, 10g, 10h, 10i). It should be appreciated that the combination shown in FIG. 5 is exemplary in nature and that any combination and number of the self-service checkout terminals 10a, 10b, 10c, 10d, 10e, 10f, 10g, 10h, and 10i may be operated by any combination of the remote supervisor terminals 22b and 22c.

Figure 6:
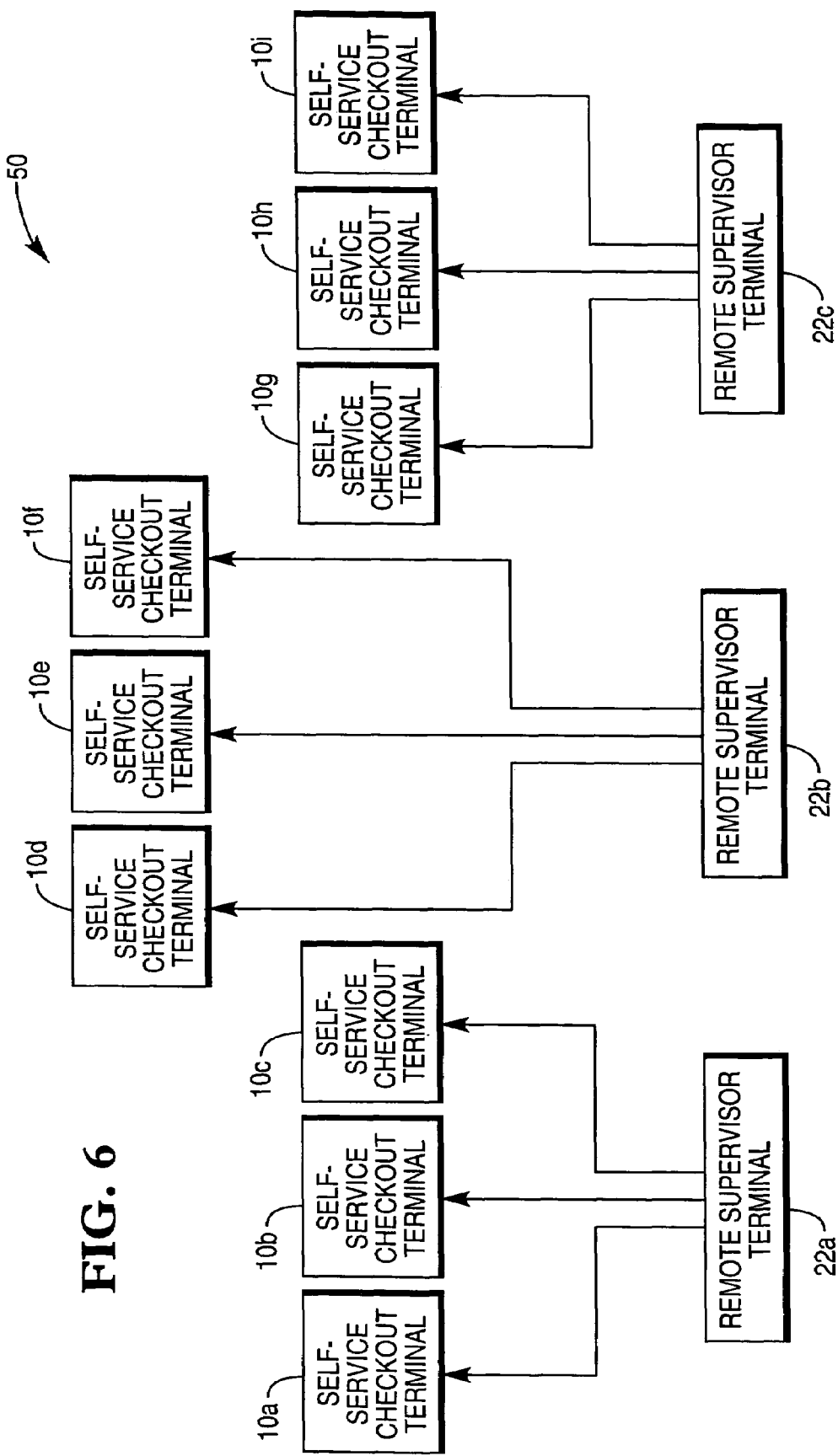
FIG. 6 is a view similar to FIG. 4, but showing operation of the self-service checkout terminals being monitored by three remote supervisor terminals.

If demand in the store continues to increase, a third remote supervisor terminal (e.g. the remote supervisor terminal 22a) may "open" as shown in FIG. 6. In such a situation, the self-service retail system 50 is once again dynamically reconfigured such that the remote supervisor terminal 22a is operated to monitor operation of a first group of the self-service checkout terminals (e.g. the self-service checkout terminals 10a, 10b, 10c), the remote supervisor terminal 22b is operated to monitor operation of a second group of the self-service checkout terminals (e.g. the self-service checkout terminals 10d, 10e, 10f), and the remote supervisor terminal 22c is operated to monitor operation of a third group of the self-service checkout terminals (e.g. the self-service checkout terminals 10g, 10h, 10i). It should be appreciated that the combination shown in FIG. 6 is exemplary in nature and that any combination and number of the self-service checkout terminals 10a, 10b, 10c, 10d, 10e, 10f, 10g, 10h, and 10i may be operated by any combination of the remote supervisor terminals 22a, 22b, 22c.

Figure 7:
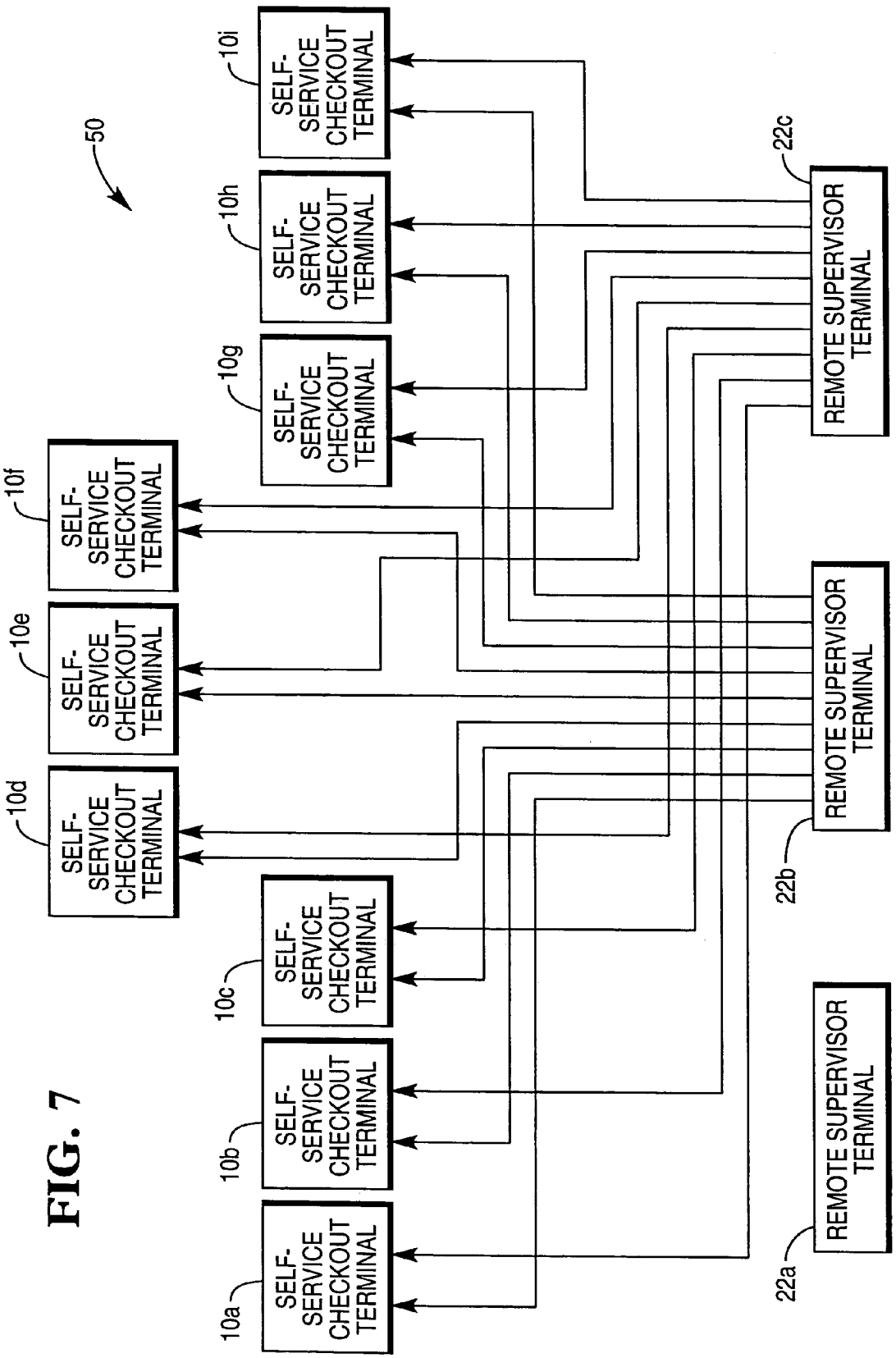
FIG. 7 is a view similar to FIG. 4, but showing the retail system in a training mode or a queuing mode of operation.
Figure 8:
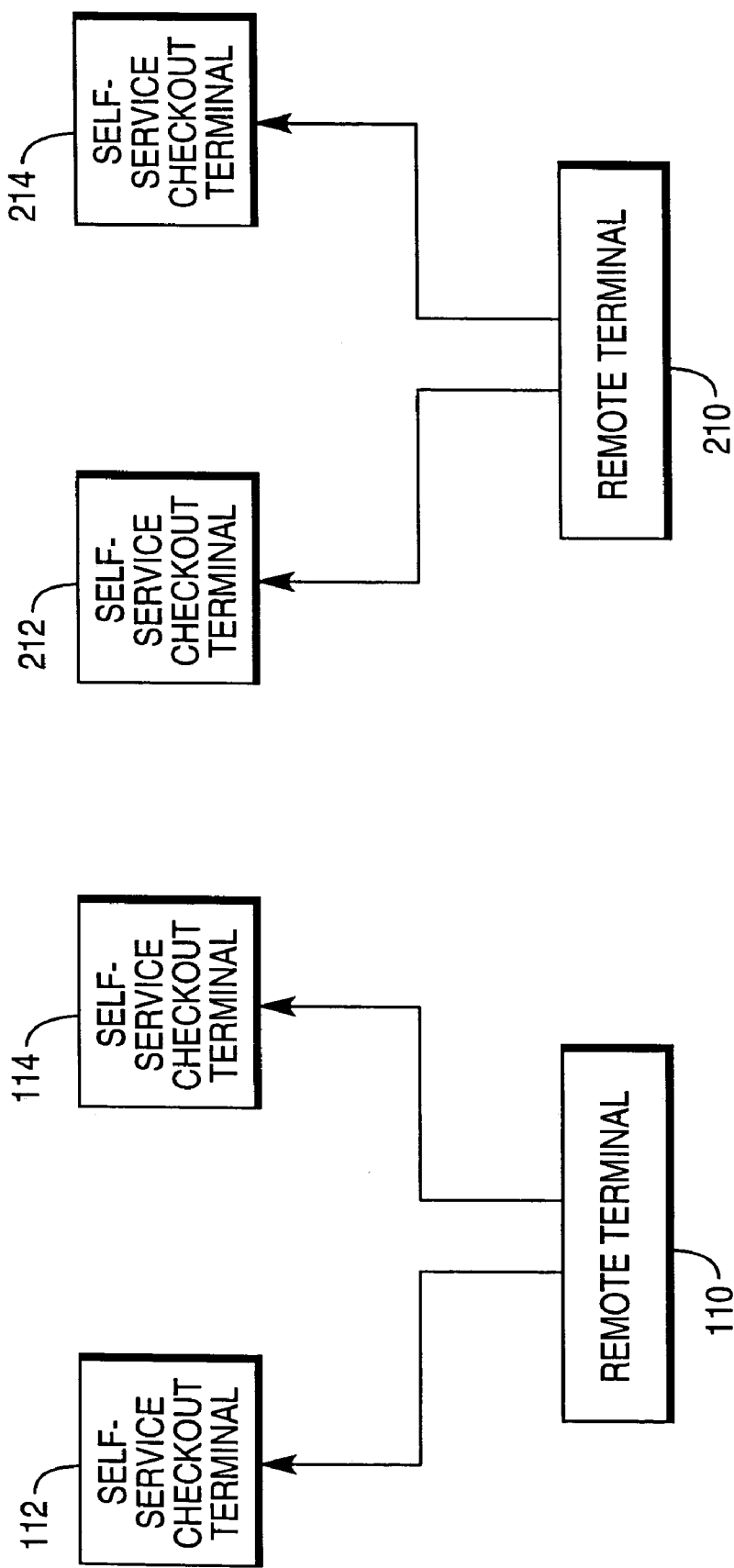
FIG. 8 is simplified diagram of a prior art self-service retail system.

Moreover, as shown in FIG. 7, two or more of the remote supervisor terminals 22a, 22b, 22c (in the case of FIG. 7, terminals 22b and 22c) may be operated to monitor operation of each of the self-service checkout terminals 10a, 10b, 10c, 10d, 10e, 10f, 10g, 10h, and 10i. In such a configuration, only one of the supervisor terminals 22a, 22b, 22c actually interacts with the customer so as to prevent a duplication of efforts by the store employees operating the remote supervisor terminals 22a, 22b, 22c. For example, in regard to FIG. 7, the store employee staffing the remote supervisor terminal 22c may be a trainee that is not actively involved in the monitoring of operation of the self-service checkout terminals 10a, 10b, 10c, 10d, 10e, 10f, 10g, 10h, and 10i, but is observing the actions of the employee operating the remote supervisor terminal 22b.

Moreover, in regard to FIG. 7, a queuing sequence may be utilized in which intervention requests are handled by either of the remote supervisor terminals 22b and 22c based on the availability of the terminals. For example, if the customer operating the self-service checkout terminal 10c needs assistance (i.e. intervention), such an intervention request would be routed to the remote supervisor terminal 22c if the remote supervisor terminal 22b is busy monitoring operation of another one of the self-service checkout terminals. However, if both of the remote supervisor terminals 22b and 22c are busy when such an intervention request is generated by the customer operating the self-service checkout terminal 10c, the intervention request may be assigned to the remote supervisor terminal 22b and 22c with the shortest queue.

While the invention has been illustrated and described in detail in the drawings and foregoing description, such an illustration and description is to be considered as exemplary and not restrictive in character, it being understood that only the preferred embodiment has been shown and described and that all changes and modifications that come within the spirit of the invention are desired to be protected.

There are a plurality of advantages of the present invention arising from the various features of the retail system described herein. It will be noted that alternative embodiments of the retail system of the present invention may not include all of the features described yet still benefit from at least some of the advantages of such features. Those of ordinary skill in the art may readily devise their own implementations of a retail system that incorporate one or more of the features of the present invention and fall within the spirit and scope of the present invention as defined by the appended claims.

What is claimed is:

1. A method of operating a retail system which includes (i) a plurality of self-service checkout terminals, (ii) a first remote supervisor terminal, and (iii) a second remote supervisor terminal, comprising the steps of:
    (a) operating said first remote supervisor terminal such that said first remote supervisor terminal monitors operation of each of said plurality of self-service checkout terminals during a first period of time;
    (b) maintaining said second remote supervisor terminal in an idle mode of operation such that said second remote supervisor terminal does not monitor operation of any of said plurality of self-service checkout terminals during said first period of time;
    (c) operating said first remote supervisor terminal such that said first remote supervisor terminal monitors operation of a first group of said plurality of self-service checkout terminals during a second period of time; and
    (d) operating said second remote supervisor terminal such that said second remote supervisor terminal monitors operation of a second group of said plurality of self-service checkout terminals during said second period of time, wherein said first group of said plurality of self-service checkout terminals is different from said second group of said plurality of self-service checkout terminals, wherein said first remote supervisor terminal is configured to enable a store employee located at said first remote supervisor terminal to communicate with customers respectively located at each of said first group of said plurality of self-service checkout terminals via audio, video, and data connection during step (c), and wherein said second remote supervisor terminal is configured to enable a store employee located at said second remote supervisor terminal to communicate with customers respectively located at each of said second group of said plurality of self-service checkout terminals via audio, video, and data connection during step (d).

2. The method of claim 1, wherein said step of operating said first remote supervisor terminal such that said first remote supervisor terminal monitors operation of each of said plurality of self-service checkout terminals includes the step of operating said first remote supervisor terminal such that said first remote supervisor terminal monitors operation of each of said plurality of self-service checkout terminals so as to assist a plurality of customers respectively operating each of said plurality of self-service checkout terminals.

3. The method of claim 1, wherein:
said step of operating said first remote supervisor terminal such that said first remote supervisor terminal monitors operation of said first group of said plurality of self-service checkout terminals includes the step of operating said first remote supervisor terminal such that said first remote supervisor terminal monitors operation of said first group of said plurality of self-service checkout terminals so as to assist a first group of customers respectively operating each of said first group of self-service checkout terminals, and said step of operating said second remote supervisor terminal such that said second remote supervisor terminal monitors operation of said second group of said plurality of self-service checkout terminals includes the step of operating said second remote supervisor terminal such that said second remote supervisor terminal monitors operation of said second group of said plurality of self-service checkout terminals so as to assist a second group of customers respectively operating each of said second group of self-service checkout terminals.

4. The method of claim 1, wherein said step of operating said first remote supervisor terminal such that said first remote supervisor terminal monitors operation of each of said plurality of self-service checkout terminals includes the step of operating said first remote supervisor terminal so as to provide security to each of said plurality of self-service checkout terminals during said first period of time.

5. The method of claim 1, wherein:
said step of operating said first remote supervisor terminal such that said first remote supervisor terminal monitors operation of said first group of said plurality of self-service checkout terminals includes the step of operating said first remote supervisor terminal so as to provide security to said first group of said plurality of self-service checkout terminals during said second period of time, and said step of operating said second remote supervisor terminal such that said second remote supervisor terminal monitors operation of said second group of said plurality of self-service checkout terminals includes the step of operating said second remote supervisor terminal so as to provide security to said second group of said plurality of self-service checkout terminals during said second period of time.

6. The method of claim 1, wherein said retail system further includes a third remote supervisor terminal, further comprising the steps of:
operating said first remote supervisor terminal such that said first remote supervisor terminal monitors operation of a third group of said plurality of self-service checkout terminals during a third period of time;

operating said second remote supervisor terminal such that said second remote supervisor terminal monitors operation of a fourth group of said plurality of self-service checkout terminals during said third period of time; and operating a third remote supervisor terminal such that said third remote supervisor terminal monitors operation of a fifth group of said plurality of self-service checkout terminals during said third period of time, wherein each of said first group of self-service checkout terminals, said second group of self-service checkout terminals, said third group of self-service checkout terminals, said fourth group of self-service checkout terminals, and said fifth group of self-service checkout terminals is different from one another.

7. A method of operating a retail system, comprising the steps of:
(a) operating a first remote supervisor terminal so as to monitor operation of a first group of self-service checkout terminals during a first period of time;

(b) operating a second remote supervisor terminal so as to monitor operation of a second group of self-service checkout terminals during said first period of time;

(c) operating said first remote supervisor terminal so as to monitor operation of said second group of self-service checkout terminals during a second period of time; and (d) operating said second remote supervisor terminal so as to monitor operation of said first group of self-service checkout terminals during said second period of time, wherein said first group of self-service checkout terminals is different from said second group of self-service checkout terminals, wherein said first remote supervisor terminal is configured to enable a store employee located at said first remote supervisor terminal to communicate with customers respectively located at each of said first group of self-service checkout terminals via audio, video, and data connection during step (a), wherein said second remote supervisor terminal is configured to enable a store employee located at said second remote supervisor terminal to communicate with customers respectively located at each of said second group of self-service checkout terminals via audio, video, and data connection during step (b), wherein said first remote supervisor terminal is configured to enable a store employee located at said first remote supervisor terminal to communicate with customers respectively located at each of said second group of self-service checkout terminals via audio, video, and data connection during step (c)

wherein said second remote supervisor terminal is configured to enable a store employee located at said second remote supervisor terminal to communicate with customers respectively located at each of said first group of self-service checkout terminals via audio, video, and data connection during step (d).

8. The method of claim 7, wherein:
said step of operating said first supervisor terminal so as to monitor operation of said first group of self-service checkout terminals includes the step of operating said first supervisor terminal so as to assist a first group of customers respectively operating said first group of self-service checkout terminals during said first period of time, and
said step of operating said second supervisor terminal so as to monitor operation of said second group of self-service checkout terminals includes the step of operating said second supervisor terminal so as to assist a second group of customers respectively operating said second group of self-service checkout terminals during said first period of time.

9. The method of claim 8, wherein:
said step of operating said first supervisor terminal so as to monitor operation of said second group of self-service checkout terminals includes the step of operating said first supervisor terminal so as to assist a third group of customers respectively operating said second group of self-service checkout terminals during said second period of time, and
said step of operating said second supervisor terminal so as to monitor operation of said first group of self-service checkout terminals includes the step of operating said second supervisor terminal so as to assist a fourth group of customers respectively operating said first group of self-service checkout terminals during said second period of time.

10. The method of claim 7, wherein:
said step of operating said first supervisor terminal so as to monitor operation of said first group of self-service checkout terminals includes the step of operating said first supervisor terminal so as to provide security to said first group of self-service checkout terminals during said first period of time, and
said step of operating said second supervisor terminal so as to monitor operation of said second group of self-service checkout terminals includes the step of operating said second supervisor terminal so as to provide security to said second group of self-service checkout terminals during said first period of time.

11. The method of claim 10, wherein:
said step of operating said first supervisor terminal so as to monitor operation of said second group of self-service checkout terminals includes the step of operating said first supervisor terminal so as to provide security to said second group of self-service checkout terminals during said second period of time, and
said step of operating said second supervisor terminal so as to monitor operation of said first group of self-service checkout terminals includes the step of operating said second supervisor terminal so as to provide security to said first group of self-service checkout terminals during said second period of time.

12. The method of claim 7, further comprising the step of operating a third remote supervisor terminal so as to monitor operation of both said first group of self-service checkout terminals and said second group of self-service checkout terminals during a third period of time.

13. A self-service retail system, comprising:
a plurality of self-service checkout terminals for allowing a plurality of customers to checkout items for purchase;
a first remote supervisor terminal electrically coupled via audio, video and data connection to each of said plurality of self-service checkout terminals so as to enable a store employee located at said first remote supervisor terminal to communicate with customers respectively located at each of said plurality of self-service checkout terminals via said audio, video, and data connection; and
a second remote supervisor terminal electrically coupled via audio, video and data connection to each of said plurality of self-service checkout terminals so as to enable a store employee located at said second remote supervisor terminal to communicate with customers respectively located at each of said plurality of self-service checkout terminals via said audio, video, and data connection,
wherein (i) said first remote supervisor terminal is configured to monitor operation of each of said plurality of self-service checkout terminals during a first period of time, (ii) said second remote supervisor terminal is maintained in an idle mode of operation during said first period of time, (iii) said first remote supervisor terminal is further configured to monitor operation of a first group of said plurality of self-service checkout terminals during a second period of time, (iv) said second remote supervisor terminal is further configured to monitor operation a second group of said plurality of self-service checkout terminals during said second period of time, and (v) said first group of said plurality of self-service checkout terminals is different from said second group of said plurality of self-service checkout terminals.

14. The self-service retail system of claim 13, wherein said first remote supervisor terminal is further configured to assist each of said plurality of customers during said first period of time.

15. The self-service retail system of claim 13, wherein:
said first remote supervisor terminal is further configured to assist a first group of said plurality of customers during said second period of time, and
said second remote supervisor terminal is further configured to assist a second group of said plurality of customers during said second period of time.

16. The self-service retail system of claim 13, wherein said first remote supervisor terminal is further configured to provide security to each of said plurality of self-service checkout terminals during said first period of time.

17. The self-service retail system of claim 13, wherein:
said first remote supervisor terminal is further configured to provide security to said first group of said plurality of self-service checkout terminals during said second period of time, and
said second remote supervisor terminal is further configured to provide security to said second group of said plurality of self-service checkout terminals during said second period of time.

* * * * *